Jan. 15, 1957 F. C. WILLIAMS ET AL 2,777,634
ELECTRONIC DIGITAL COMPUTING MACHINES
Filed Aug. 14, 1950 8 Sheets-Sheet 1
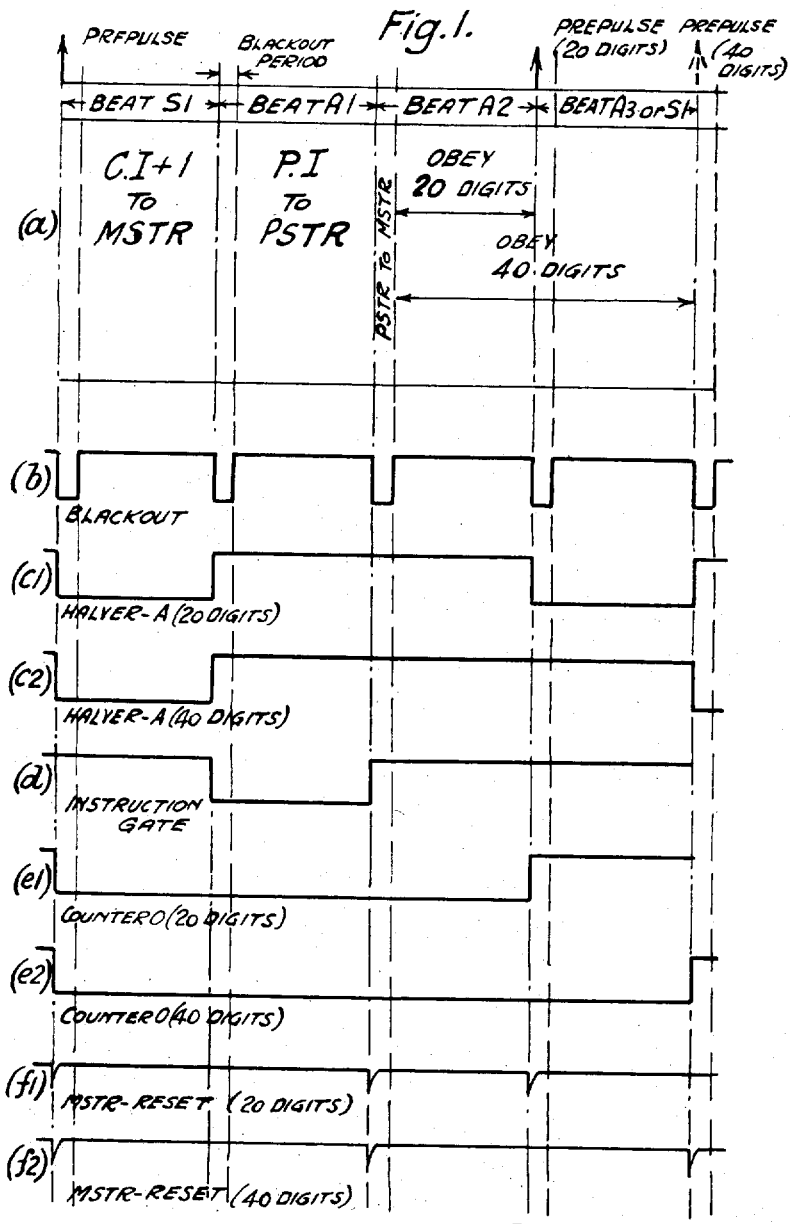
Inventors:
F. C. Williams
T. Kilburn
By Moore and Hall
Attorneys

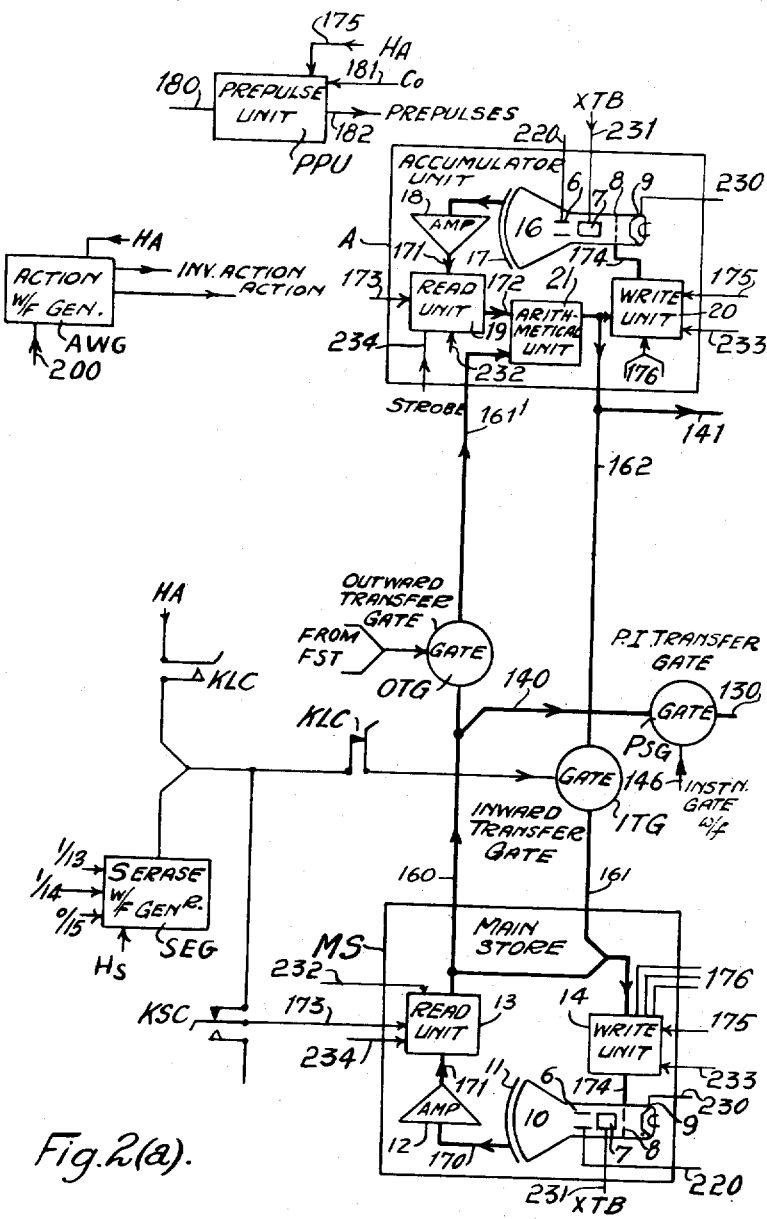

Inventors:
F. C. Williams
T. Kilburn
By Moore and Hall
Attorneys

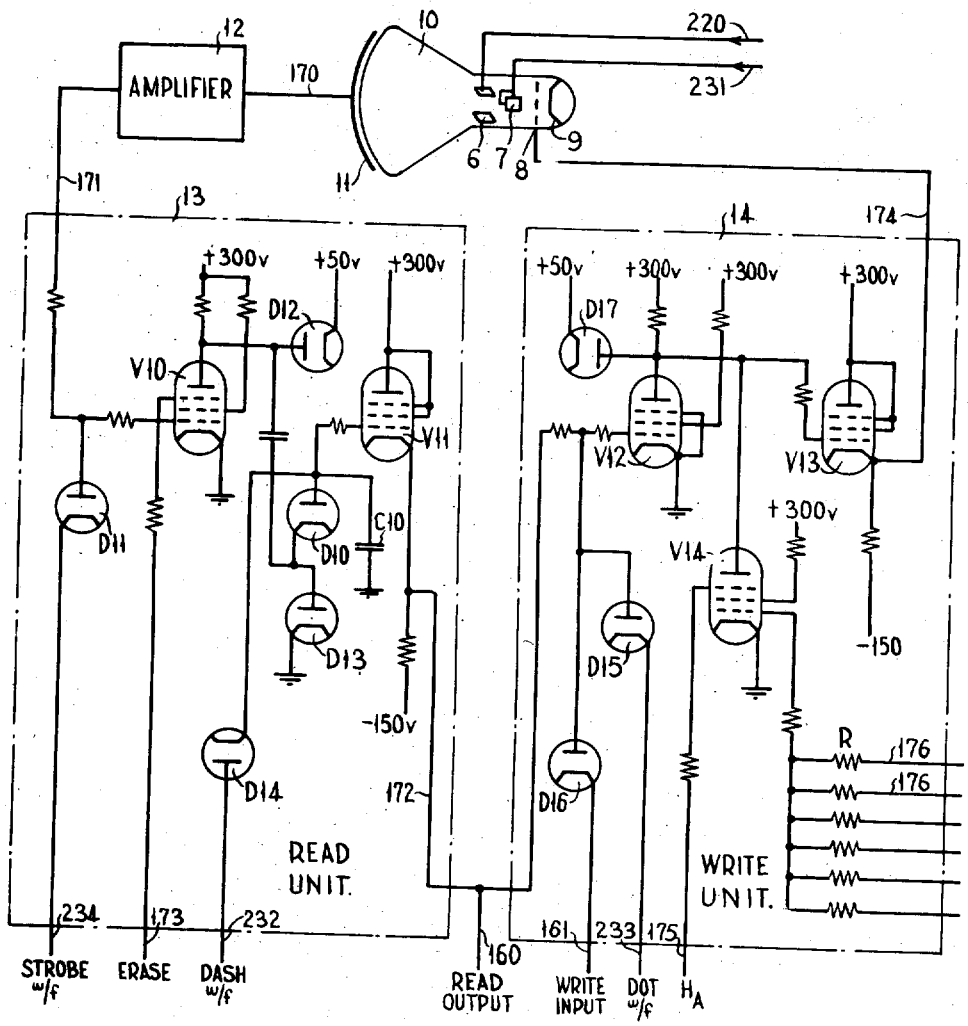

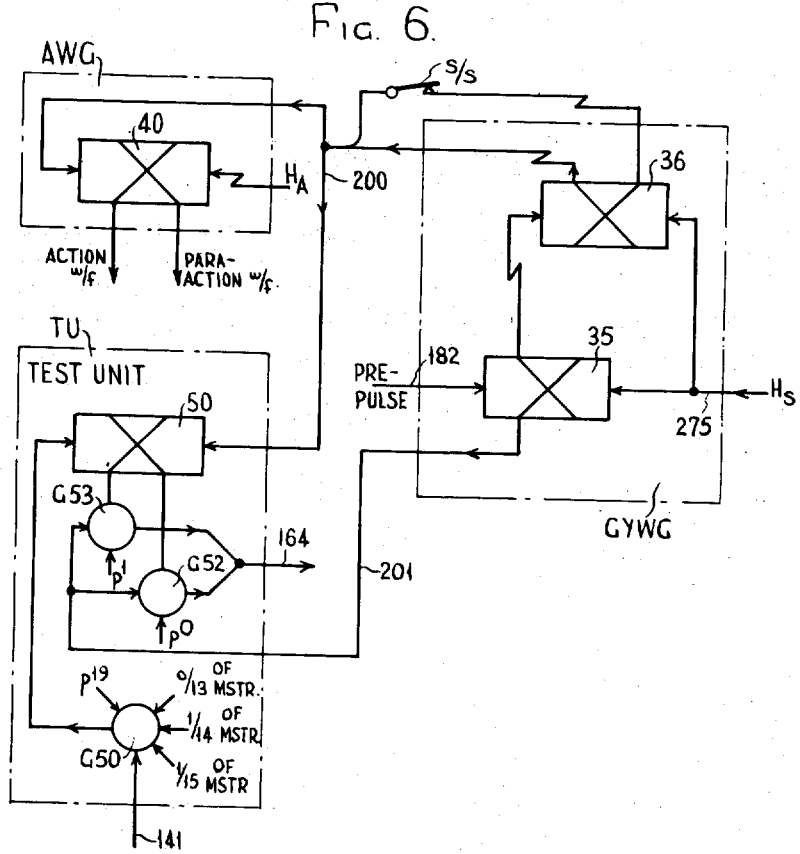
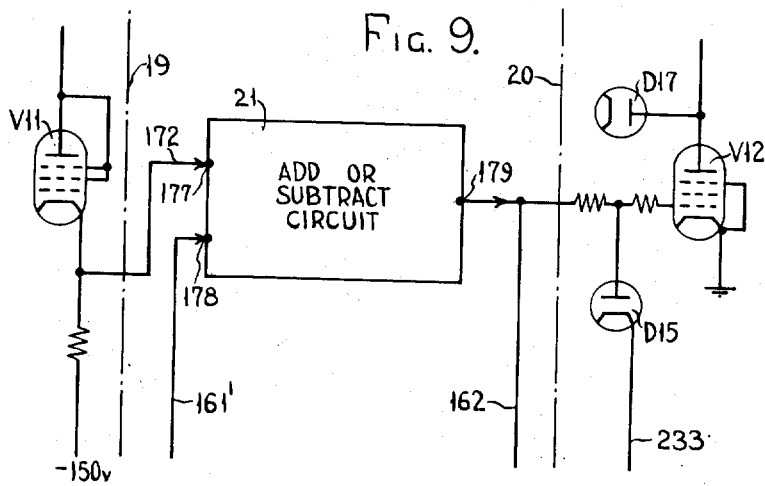

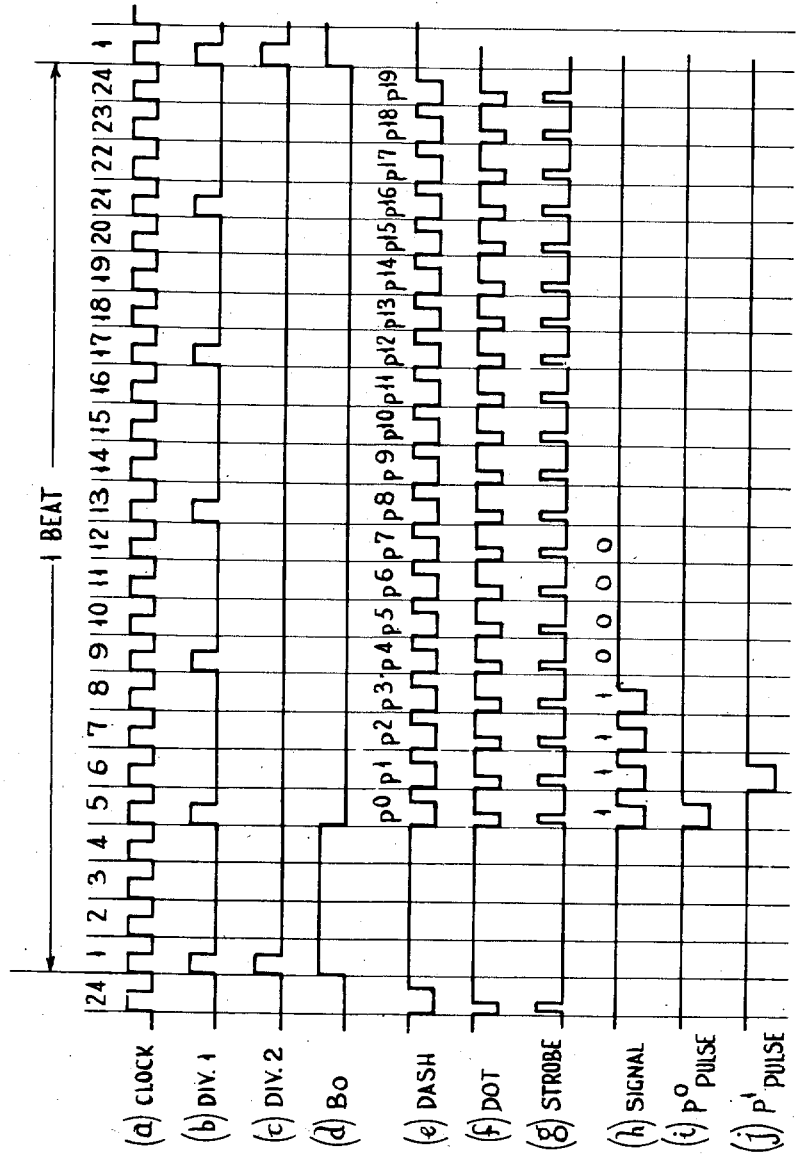

United States Patent Office 2,777,634
Patented Jan. 15, 1957

2,777,634
ELECTRONIC DIGITAL COMPUTING MACHINES

Frederic Calland Williams, Timperley, and Tom Kilburn, Manchester, England, assignors to National Research Development Corporation, London, England, a corporation of Great Britain Application August 14, 1950, Serial No. 179,262

Claims priority, application Great Britain August 17, 1949

11 Claims. (Cl. 235—61)

This invention relates to electronic digital computing machines of the type which employ electrostatic digital storage or memory devices of the kind described in the paper by F. C. Williams and T. Kilburn in Proc. I. E. E., Part III, March 1949, pages 81–100, one form of machine employing such electrostatic storage devices operates with binary digital numbers upon a basic rhythm defined as "four beats in a bar" or, in other words, four minor or sub-cycles in each completed operative cycle during which one step of the computing operation programme is performed.

The first, Scan 1, beat of each bar is concerned with the alteration of a short control number C. I. already existing in a special control unit store of the machine into a new control number, C. I.+1, and the use of such number to set up the address selecting mechanism of the main data storage device to the location of the next required instruction or P. I. word while the second, Action 1, beat is concerned with the reading out of such selected instruction word from the main storage device to another location in the control store, the third, Scan 2, beat being concerned with the use of a part of such temporarily stored instruction word, in similar manner to the control number during the first beat, to set up the address selecting mechanism of the main storage device once again, this time to the location of the particular number or other word which is to be dealt with during the current computation step. At the same time, during this third beat, other parts of such instruction word are used to set up various gate circuits or like means which open or close the various signal transfer channels between the main storage device and other elements, such as an accumulator or computing organ, of the machine so as to condition the machine in readiness to carry out the particular form of operation, such as addition or multiplication within such accumulator, which is required to be performed with the chosen number or other word. In the fourth and last, Action 2, beat of the bar such selected number or other word is read out from the main storage device and handled in the specified manner. Another form of machine while generally similar in operating principles to such four-beat machines, operates with a basic rhythm of only "two beats in a bar."

In this form of machine the various instruction words are held in a storage device separate from that of the main storage device where the required number words are located and in the first beat of the bar the same short control number C. I. already existing in a special control unit store is altered into a new control number, C. I.+1, and then used to set up the address selecting mechanism of the additional instruction store to the location of the next required instruction word P. I. In the second beat this selected instruction number is read out of the instruction store and used, as in the four beat machine, to set up the address selecting mechanism of the main storage device to the location of the required number word and to condition the machine to perform the desired type of operation during the next following (third) beat which is substantially identical with the fourth beat of the four beat rhythm. There is thus a total of three beats required for each individual computation step but as it is possible to arrange for the first beat of one bar to overlap with the last beat of the preceding bar the effective length is only two beats. Such four- and two-beat rhythms are dictated by the need to provide, firstly, so-called "scan" beats during which periodical regeneration of all stored data (in the form of so-called number words and instruction words) held upon the cathode ray tube storage devices of the machine is effected and in which the setting-up of the store address selecting mechanism by which a required one of the multiplicity of stored data items in a store may be made available in the succeeding beat takes place and, secondly, so-called "action" beats during which a transfer or arithmetical operation is performed with the data item previously selected. In these earlier machines such scan and action beats are alternated, so far as the multiple-address storage devices are concerned although, in the two-beat rhythm, the scan and action beats of the main storage devices are interlaced with respect to those of the separate instruction word storage device to achieve an increased speed. Such gain in speed of the two-beat machine over the four-beat machine is obtained at the cost of increased complexity and the disadvantage that the aforesaid separate stores must be provided for the number words being operated with and the instruction words which control the operations performed with such number words.

The object of the present invention is to provide an electronic digital computing machine of the kind referred to which is capable of operating at a significantly higher speed than the four-beat machine referred to but which does not require the use of separate storage facilities for number data and for instruction data.

According to the present invention an electronic digital computing machine of the kind referred to is arranged to operate upon a fundamental rhythm of three beats in a bar, each instruction word when read out from a storage system of the machine during a first action beat being held upon an instruction staticisor from whence it is transferred in parallel form to the staticisor which controls the main store address selection, before the commencement of the digit-handling portion of the beat which follows such first action beat and which is, itself, also an action beat.

The first beat of the three-beat bar is a scan beat and provides that the content of one address on each cathode-ray-tube of the storage system of the machine is regenerated during each bar, the regeneration of all addresses (single lines, or part-lines if the storage raster on each cathode-ray-tube is split into columns) proceeding in a cyclic manner as in the earlier machines referred to above.

In a modification of the invention the fundamental three-beat bar may be extended to comprise four beats, an initial scan beat followed by three action beats, to enable the machine to be operated with a basic number length of $2n$ digits when the beat interval is such that only $n$ digits can be included in a word which can be expressed dynamically in a single beat. The specification of co-pending patent application Ser. No. 179,261 by F. C. Williams, T. Kilburn and G. C. Tootill, filed August 14, 1950, for Electronic Digital Computing Machines (hereinafter referred to as specification F), describes a method whereby normal length numbers of $2n$ digits length may be utilised by appropriate extensions of the bar length and an arrangement of the main storage system which permits two halves (of $n$ digits each) of a normal ($2n$ digit) number word, each held in separate addresses of the store, to be transferred by a single instruction. Such method is one which may also be used in the present invention.

In order that the nature of the invention may be more clearly understood one embodiment thereof will now be described with reference to the accompanying drawings in which:

Figure 1 illustrates in tabular form the sequence of events occurring in a three-beat-to-the-bar machine according to the present invention. This figure also illustrates the nature of certain essential waveforms involved in the operation of the machine.

Figures 2a, 2b show, in simplified block schematic diagram form, the principal elements of a three-beat machine according to the invention.

Figure 5 illustrates in partly schematic and partly detailed circuit form the arrangement of a main storage device of the cathode ray tube type.

Figure 6 illustrates schematically the arrangement of the test unit.

Figure 8 shows a series of waveform diagrams illustrating the nature of various operating potentials within the machine.

Figure 9 illustrates the modifications necessary to a storage device as shown in Figure 5 to form an accumulator device.

Figure 2B:
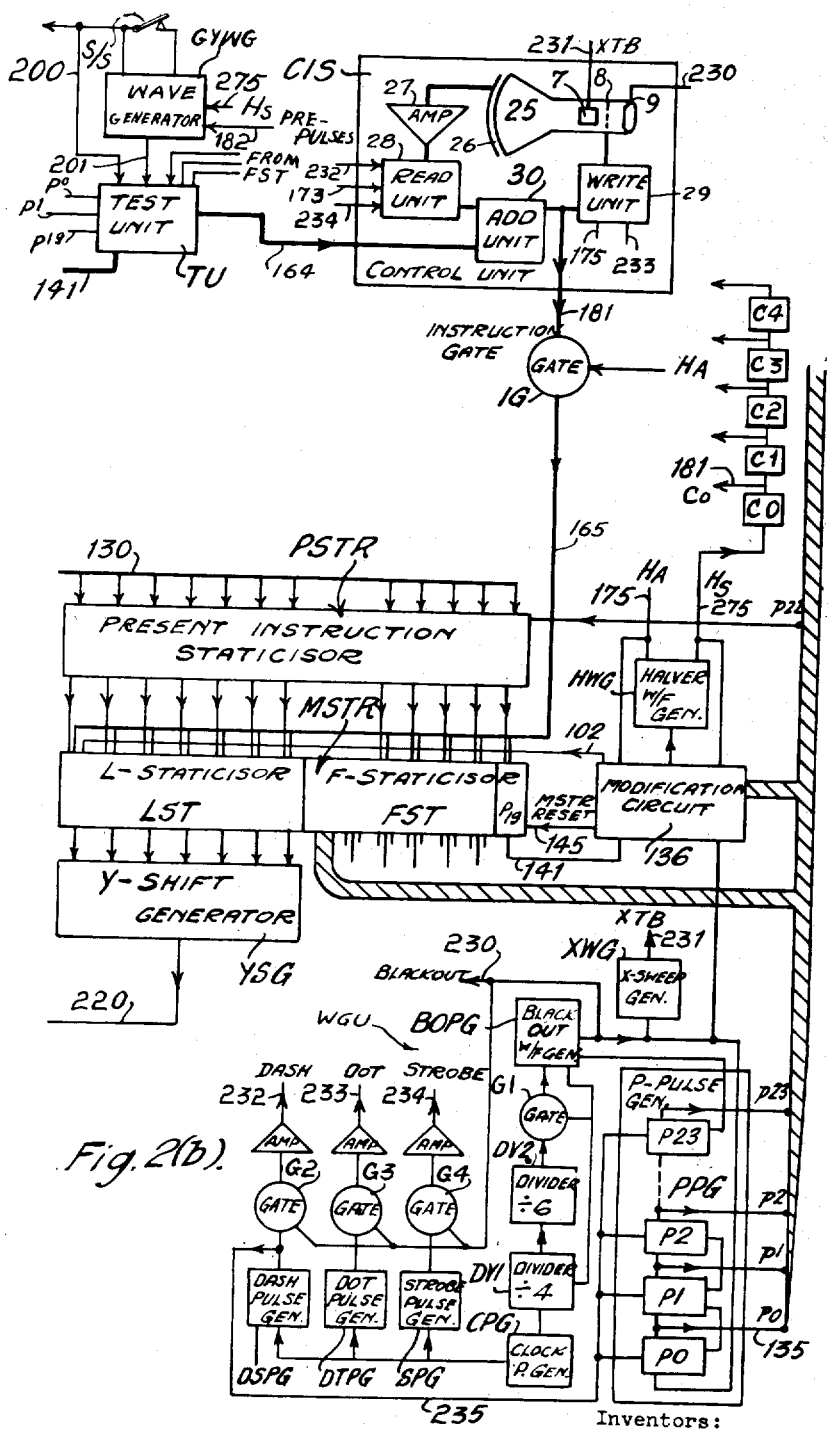

The operation of the basic three-beat rhythm of the present invention, as applied to a computing machine employing cathode ray tube electrostatic storage of the kind referred to and working in the serial mode, will first be explained with reference to Fig. 1(a) which shows the sequence of events in one complete operative cycle or bar. It will be assumed that 20-digit numbers are ordinarily employed and can be dealt with dynamically within one beat. That is to say, each beat will embrace a period of time sufficient to include 20 successive digit or so called Clock intervals of the machine rhythm plus the requisite extra time period, known as the Blackout period, for effecting the fly-back movement of the tube beam in the manner described in the aforesaid paper. This Blackout period is assumed to occupy 4 digit intervals so that each beat is equal to 24 digit or Clock intervals. The various separate digit positions of each word are defined by a series of separate $p$-Pulses and these, as in said specification F, will be 20 in number, $p0$–$p19$. But unlike the arrangements of said specification F, the series of $p$-Pulses is extended to include pulses covering the Clock intervals of the Blackout periods, i. e. $p$-Pulses $p20$–$p23$.

Referring now to Fig. 1(a) during the first beat of the bar, scan beat S1, the main storage system of the machine will be regenerating while the altered Control Instruction (C. I.+1) word is fed to the staticisor (MSTR) controlling address-selection within the main store, from a subsidiary store, e. g. the control instruction store or the control unit. During the second beat A1, which is the first Action beat, the address in the main store which was selected by the previous Control Instruction word, is made active and an instruction word located therein, the Present Instruction (P. I.) word is read out and is fed to set up a special staticisor, the P. I. staticisor (PSTR) which is used for holding P. I. words only in static form. This special P. I. staticisor is so coupled, in a manner hereinafter described, with the staticisor (MSTR) of the main storage system that upon resetting of the P. I. staticisor, the (P. I.) word held thereon, is automatically transferred to the main store staticisor. This transfer cannot take place until the end of the digit-handling portion of the beat A1 since the main store staticisor is in use during that beat for controlling the address-selection in the main store of the P. I. word. Provision is therefore made so that in the Blackout period which separates the digit-handling portions of beats A1 and A2, the main store staticisor is first reset and this operation then followed by the resetting of the P. I. staticisor so that the main store staticisor is simultaneously set-up with such P. I. word.

The machine is then in a condition to proceed with the obeying of the Present Instruction (P. I.) and this occurs in the third beat A2, a word transfer into or out of the address in the main store as defined by the P. I. word then taking place.

The machine, when operating automatically will perform bars of operation sequentially and, as in the earlier machines, a prepulse or starting signal is given at the end of each bar (i. e. each three-beat interval in the present case to initiate the next bar by causing the release of a pulse signal representative of $2^0$ or unity for addition to the existing C. I. number and thereby to change the form of the C. I. word to C. I.+1 which is appropriate to perform the next desired step of the sequence of computing operations. This change will be effected by causing, $a+1$ signal to be fed to an adding unit associated with the control unit so that the number C. I.+1 is fed to the main store staticisor to effect selection of the next Present Instruction word held in that store. The requisite prepulse signals thus normally occur at the instant of commencement of every third beat as shown in Fig. 1.

If the machine is being operated in a manner which involves the transfer of 40-digit (i. e. $2n$-digit) numbers or words out of the main store and within the arithmetical unit, then the bar involving the transfer or computation will necessarily be extended by an additional action beat, as shown at A3 in Fig. 1 during which the second 20-digit half of the number is being dealt with. The prepulse signal normally released at the end of beat A2 is then inhibited and is replaced by a prepulse at the end of beat A3.

Figs. 2a and 2b illustrate, in combination, the principal elements of a digital computing machine arranged in accordance with the invention to operate with a basic rhythm of three beats to the bar, or under certain extension beat conditions, four beats to a bar.

The machine shown in Figures 2a and 2b comprises, broadly, a main data item store MS for recording both number of instruction-representing signals, an accumulator or computing unit A in which an arithmetical operation, such as addition or subtraction, is carried out with number-representing signals, a control unit CIS which controls the selection of the required instructions from the main store MS in order to carry out a desired predetermined programme of computation steps and the subsequent obeying of those instructions, a main store staticisor MSTR which serves to convert a dynamic form pulse train signal into a series of static control potentials, and which consists of an address selecting or L-staticisor unit LST and a function or F-staticisor unit FST, a test unit TU which, when required examines an applied pulse signal train to determine the signalled value of the sign-representing digit thereof and, in accordance with the result of such test, controls a subsequent instruction selecting operation, a prepulse unit PPU which generates the starting signal initiating the commencement of each operative bar, an action waveform generator AWG, a halver waveform generator HWG, a modification circuit 136, timing means WGU in the form of a plurality of waveform generator units for providing the requisite waveforms for controlling the operating rhythm of the machine and various transfer route controlling gates such as the inward and outward transfer gates OTG and ITG and the instruction gate IG which will be referred to in greater detail later.

As the machine is fundamentally controlled throughout by the various waveforms generated in the unit WGU, the latter will first be described at some detail. This timing means WGU comprises a master or clock oscillator CPG which operates at a stable frequency of 100 kc./s., and provides a squared-pulse output, known as the Clock waveform shown in Fig. 8a. This waveform comprises a square pulse once every 10 microseconds and is applied to a pulse dividing or counting circuit DV1 of any suitable form, e. g. of the so-called phantastron type, which divides by a factor of four to provide an output waveform DIV1 consisting of a pulse coincident with every fourth input pulse as shown in Fig. 8b. The output from this dividing circuit DV1 is supplied to a second and similar pulse dividing circuit DV2 which divides by a factor of six to provide the DIV2 waveform of Fig. 8c consisting of a pulse coincident with every 24th clock pulse. The pulses of this DIV2 waveform serve to define the above described minor cycle or beat intervals of the machine rhythm.

Each beat contains a total of 20 operative or digit-representing Clock intervals for signalling respectively the digit coefficient values of 20 successive binary digits of ascending power value. Thus the first operative digit interval, known as the $p0$ interval, may represent the binary power $2^0$, the second interval, $p1$, the binary power $2^1$ and the last or 20th interval, $p19$, the binary power $2^{19}$. In addition to these 20 operative digit intervals, each beat consists of a further four Clock intervals for accommodating the fly-back motion of the storage tube beam necessary at the end of each storage line or X-scanning motion as described in the aforesaid paper. To define this fly-back or Blackout period during each beat the output from the circuit DV2 is applied through an "and" type gate G1 as a triggering input to a two-stable-state electronic trigger circuit BOPG. This trigger circuit may be of any convenient type, e. g. of the so-called Eccles-Jordan type, having separate controlling inputs for altering its condition to one, the triggered, state and to the other, the reset, state. An example of a suitable circuit is that shown in "Time Bases" by O. S. Puckle (Chapman and Hall), 1944, page 54, with the difference that separate control potentials are applied to each of the control grids of the two cross-connected valves instead of having each control grid supplied in parallel from a single source as shown in that reference. This trigger circuit BOPG generates the Blackout or BO waveform, shown in Fig. 8d, comprising a pulse lasting from the instant when the circuit is triggered by the output pulse from the divider DV2 until the circuit is reset by the next output pulse from divider DV1, four digit intervals later, whereby the Blackout pulse persists over the first four Clock intervals of each 24 interval beat period. The remaining 20 Clock intervals before the next Blackout pulse constitute the 20 operative or digit-representing intervals of each beat as previously mentioned. This Blackout waveform is made available throughout the machine over busbar 230.

The Clock waveform is also applied as a triggering medium to three squared-pulse generators DSPG, DTPG and SPG. These generators are of any suitable form conveniently of the mono-stable trigger circuit type whereby, after triggering to their unstable state, they generate a square pulse of predetermined time duration before reverting to their normal stable state in readiness for receiving the next triggering impulse. A suitable circuit is shown in Fig. 24, page 45, of the aforesaid text book "Time Bases" by O. S. Puckle. The pulse generator DSPG provides a pulse of 6 microseconds' duration subsequent to each triggering input pulse, and its output is applied through an "and" type gate G2 and thence to an amplifier of any suitable form, the output from which, supplied throughout the machine on busbar 232, constitutes the Dash waveform of Fig. 8e. The gate G2 is controlled by the Blackout waveform (Fig. 8d) to be closed during the Blackout pulse period, whereby the resultant Dash waveform thus consists of a series of negative-going 6 microsecond pulses one during each of the 20 operative digit intervals $p0$, $p1-p19$ of each beat period. The pulse generator DTPG is of similar form to the Dash pulse generator DSPG except that it provides a shortened pulse output of some 2 microseconds duration following each triggering input. The output from this pulse generator is fed through an "and" type gate G3 which is also controlled by the Blackout waveform and thence to an amplifier whose output, available throughout the machine on busbar 233, constitutes the Dot waveform of Fig. 8f. This Dot waveform thus comprises a series of 2 microsecond negative-going pulses, one in each of the 20 operative digit intervals of each beat. The pulse generator SPG is of similar form to the generators DSPG and DTPG except that its pulse time duration is of the order of 1 microsecond only, and the triggering input is arranged to be slightly delayed in its operation relative to the commencement of the related Dash and Dot pulses. The output from the generator SPG is fed through an "and" type gate G4 to an amplifier, whose output is available throughout the machine on busbar 234, to provide the Strobe waveform of Fig. 8g comprising a series of narrow pulses which are positive-going from a negative resting level occurring one in each operative digit interval of each beat at times slightly later than the commencement times of the Dash and Dot pulses.

As already explained, the successive operative digit intervals in each beat define the different binary digit values of the various dynamic form number-representing signals which take the form of pulse trains wherein a negative-going pulse, similar to the Dash pulse in any operative digit interval represents the binary value "1" and the absence of a pulse in any digit interval represents the binary value "0." A typical number-representing signal is shown in Fig. 8h indicative of decimal value 15. The instruction signals are similar, although the various digits have a controlling function and not a solely number-representing function. For the purpose of selectively examining any one of the clock or digit intervals, there is provided a series of waveforms on separate leads each comprising a negative-going pulse resembling a Dash pulse in a different one of the 24 clock or digit intervals $p0$, $p1-p23$ of each beat. This series of pulse waveforms, known as the $p$-Pulse waveforms are provided by a series of circuits P0–P23 constituting the $p$-pulse generator circuit PPG. Each of these circuits essentially comprises a trigger circuit and an "and" type gate controlled thereby. The trigger circuits themselves are connected in the manner of a counter-chain, whereby the first circuit P0 is triggered by the trailing edge of each Blackout pulse to put it into a condition which allows the passage of the immediately following Dash pulse in digit interval $p0$ which is supplied thereto over the lead 235 through the associated gate device. The output from this circuit consists of a Dash pulse in the first or $p0$ digit-interval of each bar as shown in Fig. 8i. The second trigger gate circuit P1 is interconnected with the first circuit P0, whereby it is triggered to a condition which opens its associated gate by the trailing edge of the output Dash pulse from the circuit P0 so that it allows the passage of the Dash pulse in the second operative digit interval $p1$ of each beat to pass through its associated gate to form the $p1$-Pulse waveform of Fig. 8j. The circuit P1 is also back-connected to the circuit P0 whereby, as it is set into its gate opening condition, it provides a resetting input pulse for the previous trigger circuit P0, so as to close the gate associated with the latter, and thereby to inhibit the passage of the second and subsequent Dash pulses of the beat therethrough. The remaining trigger gate circuits P2–P23 are similarly arranged, whereby the various p2–p23-Pulse waveforms are provided therefrom. The last circuit p23 is arranged to be reset to its gate-closed condition by the trailing edge of the next following Blackout pulse.

As explained in the aforementioned paper, storage of a number or instruction signal on the cathode ray tube screens is effected by moving the tube beam along a line which may be one of a plurality of separate storage lines arranged in a television type raster, each line holding, in the present case, 20 separate digit-representing signals or the signal train for one beat interval. The production of the necessary line scanning motion of the tube beam is effected in conventional manner by means of a saw-tooth waveform known as the XTB waveform shown in Fig. 1g and provided by a conventional triggered type sweep generator XWG which is controlled by the Blackout waveform (Fig. 1b) so as to commence its linear run-down in synchronism with the trailing edge of each Blackout pulse and to commence its fly-back portion in synchronism with the leading edge of each Blackout pulse. In practice push-pull waveforms are provided from this circuit and applied respectively to the two X deflection plates of the various cathode ray tubes throughout the machine, but for simplicity only a single busbar 231 is shown on the drawings. The above described waveforms are those which are invariable within the machine and govern its rhythmic beat operation. There are, however, a number of further waveforms which are of variable form in accordance with the changing requirements of the number of beats in each operative bar as already outlined.

A major controlling waveform of such variable form is that of the Halver waveform which is generated in a two-stable-state trigger circuit HWG to provide paraphase outputs known respectively as the $H_A$ and $H_S$ waveforms. This Halver waveform generator and its manner of operation will be described later in connection with the associated modification circuit 136. The different forms of the $H_A$ waveform provided thereby are shown in Figs. 1 c1 and 1 c2. The corresponding $H_S$ waveforms are merely paraphased versions of such $H_A$ waveforms.

From the output from the halver waveform generator are derived a number of further controlling waveforms known as the Counter 0 (C0), Counter 1 (C1), Counter 2 (C2), Counter 3 (C3) and Counter 4 (C4) waveforms whose purpose is equivalent to that of the similar waveforms mentioned in the aforesaid paper. The C0 waveform, shown in Fig. 1 (e1) for 3 beat to bar operation, is generated in a circuit C0 which is again constituted by a two-stable-state trigger circuit having a common triggering input, whereby it reverses its state with each input pulse. The triggering input pulses to this circuit are constituted by the differentiated negative-going edges of the $H_S$ waveform whereby the repetition frequency of the pulses of the counter 0 waveform is one half that of the Halver waveforms. The subsequent counter waveform generator C1–C4 are likewise each constituted by a two-stable-state trigger circuit whose triggering input is derived from the output of the immediately preceding circuit whereby the C1 waveform has a periodicity one half that of the C0 waveform, the C2 waveform a periodicity one half that of the C1 waveform and so on. By virtue of their fundamental derivation from the Halver waveform, the form of each of the counter waveforms C0–C4 is modified whenever the halver waveform is modified as will be described later.

The main storage device MS consists of one or possibly more cathode ray tube storage devices of the kind described in the aforesaid paper by Williams and Kilburn. The arrangement of a single tube as such a store is shown in Fig. 5. This arrangement comprises a cathode ray tube 10 having the usual cathode 9, control grid or beam modulating electrode 8, X deflection plates 7 and Y deflection plates 6. In addition the tube is provided with a signal pick-up plate 11 arranged close to the screen of the tube and upon which are impressed signal potentials of characteristic form according to the storage charge pattern laid down on the tube screen by bombardment thereof by the tube beam in the manner described in the aforesaid paper. The tube beam is arranged to perform a linear X-scanning motion once during each beat period by application of the XTB waveform to the X deflection plates 7 over busbar 231.

In addition, a Y or vertical deflection potential is applied by way of lead 220 to the Y deflection plates 6 to cause the X-scanning motion to take place at any one of 32 predetermined levels in a manner which will be described in greater detail later. When X-scanning motion of the tube beam takes place over a charge pattern already existing on the tube screen, signals derived from the pick-up plate 11 show a characteristic form which, with the "dot-dash" storage method described in the aforesaid paper and used in the present embodiment, are each characterised by an initial transient which is negative-going when the charge pattern is of Dot form used for signalling the binary value "0" and which is positive-going when the charge pattern is of Dash form used for signalling the binary value "1." These output signals are applied by lead 170 to the input terminals of the amplifier 12 which is conveniently of the form described in detail with reference to Figure 31 of the aforesaid paper. The output from this amplifier, in a form similar to the input but of magnified amplitude is applied by lead 171 to the read unit 13 of the storage device.

The read unit 13 comprises a thermionic valve V10 having its control grid connected to the lead 171 from the amplifier 12 and having its anode output signal supplied by way of diode D10 to the control grid of a second valve V11 which is arranged as a cathode follower with an output lead 172 from its cathode. The control grid of valve V10 is also supplied by way of diode D11 with the Strobe waveform of Fig. 8g from busbar 234, while its suppressor grid is connected by way of lead 173 to a potential (derived from the S erase waveform generator SEG, Fig. 2a) which is normally at or about that of the earthed cathode of the valve but which can be lowered to cut off the valve at its suppressor grid for erasing purposes as described in the aforesaid paper. The cathode of the valve V10 is earthed while its anode is clamped at a maximum potential of +50 v. by means of diode D12. The diode D10 through which the signal output from the valve V10 is applied to valve V11, has its cathode connected to the anode of diode D13 whose cathode is connected directly to earth, whereby the potential of the control grid of valve V11 cannot rise above earth. A condenser C10 is connected between the control grid of valve V11 and earth, while such control grid is also supplied by way of diode D14 with the Dash waveform, Fig. 8e, from busbar 232.

Valve V10 is normally held cut off as the output from the amplifier is biased to a value of −15 v., while the resting level of the Strobe waveform is of −10 v. Unless both inputs rise sufficiently at the same time, to turn on the valve at its control grid the valve will remain cut off and therefore during any negative ("0" representing) output from the amplifier 12, the valve V10 will remain inoperative. During the period of a positive ("1" representing) output pulse from the amplifier 12 the control gird of valve V10 will be raised during the coincident portion of the Strobe pulse whereby the valve V10 is turned on for the period of such Strobe pulse. As a result a negative-going pulse from a resting level of +50 v. is generated at the anode of valve V10 and this is applied through diode D10 to the control grid of valve V11, where it lowers the control grid potential relative to the cathode, and at the same time charges condenser C10. During this time the Dash waveform on busbar 232 has lowered the anode potential of diode D14 to, say, −20 v. from its normal earth resting level, so that the condenser C10 remains charged negatively and the negative-going output at the cathode of valve V11 persists until the end of the Dash pulse when, consequent upon the raising of the anode of diode D14 to earth potential, the condenser C10 is discharged and the control grid potential of valve V11 is again raised, thereby terminating the negative output pulse at the cathode of valve V11. It will thus be seen that a negative-going Dash pulse, signalling binary value "1," is provided at the correct time within the digit period for each positive transient arriving from the amplifier 12, whereas no output pulse at all is provided if the transient from the amplifier is negative-going representing binary value 0. The output on lead 172 from the cathode of valve V11 in the read unit constitutes the read output of the storage device.

This read output is used to control regeneration of the charge pattern on the tube screen by application to the input of the write unit 14. This write unit comprises a valve V12 having its control grid supplied with input signals of standard machine form, i. e. a negative-going pulse for binary value "1" and no pulse for binary value "0" as shown in Fig. 8h, while its anode is D. C. connected to the control grid of valve V13 arranged as a cathode follower output valve and having its cathode output lead 174 connected to the beam modulating electrode 8 of the cathode ray tube 10. The control grid of valve V12 is supplied with the Dot waveform Fig. 8f by way of diode D15 from busbar Z33, while in addition such control grid is also connected by way of diode D16 to a write input lead 161 upon which standard type machine signals, Fig. 8h, can be applied. The anode of valve V12 is clamped at a maximum value of +50 v. by means of diode D17 while a further so-called Blackout valve V14 having its cathode connected to earth and its anode directly connected to the anode of valve V12, has its suppressor grid supplied with the $H_A$ waveform from busbar 175. If, as is usually the case, the store comprises several storage tubes, the control grid of this valve is connected to one end of a plurality of resistors R whose opposite ends are individually connected to sources of control potential derived, in the manner described later, from the address staticisor unit LST whereby only a selected one of the respective Blackout valves V14 of the different store devices is cut-off during certain Action beats to render that tube alone operative.

In the operation of this write unit, in the absence of any input signal to the grid of valve V12 either on the read output lead 172 from the cathode of valve V11 or on the write input lead 161, the valve V12 is normally conducting and its anode potential is therefore low with the result that the control grid of valve V13 is low and the cathode output point on the latter is likewise low, to provide a potential on the beam modulating electrode 8 of the storage tube 10 sufficiently negative to cut off the tube beam. During the time of each negative pulse of the Dot waveform, Fig. 8f, which is applied through diode D15, valve V12 will be cut off and the positive-going output pulse at the anode of valve V12 will provide a similar positive-going output at the cathode of valve V13 to turn the beam of the storage tube on for the Dot pulse period and thereby to cause a Dot type storage charge pattern on the tube screen. If, however, either the output from the read unit 13 on lead 172 or the write input on lead 161 consists of a negative-going Dash pulse, Fig. 8e, representing binary value "1," the grid of valve V12 in addition to being driven negative by the Dot waveform, is also driven negative and held negative for the longer Dash pulse period and in consequence the output from valve V13 comprises a positive pulse of similar duration with resultant turning on of the tube beam to record a Dash or binary "1" value charge pattern.

The blackout valve V14 is employed to render the storage tube inoperative during action beat periods unless it is particularly selected for use during those periods while allowing it to be operative during scan beat periods when normal systematic regeneration of each of the storage lines is arranged to take place in the manner described in the aforesaid paper in all the storage tubes. This is effected by applying the $H_A$ waveform on lead 175 to the suppressor grid of the valve which is normally conductive with its grid connected to a suitable approximately earth potential by way of the resistors R and associated leads 176. In consequence of the normal anode current flow in valve V14, the anode potential of the valve, and in consequence of the potential at the anode of valve V12 and the grid potential of valve V13 are lowered also to inhibit any positive output to the modulating electrode 8 of the tube 10 sufficient to turn on the tube beam. When, however, valve V14 is cut off by the $H_A$ waveform during each scan beat the anode potential of the valve and in consequence the control grid potential of valve V13, is free to rise if it is required to do so by valve V12.

The resistors R are used to control the selection of any particular tube out of a number of exactly similar storage tubes when these are used to provide a large capacity storage device. The operation is as follows:

Each of the resistors R is connected to a different one of the output terminals of certain sections of the address selecting staticisor LST assigned to tube selection. These terminals, as explained later, may either be positive relative to earth, or negative to earth, according to the setting of the staticisor section. If any one of the resistors R is at any time connected to a positive potential source than the valve V14 will remain turned on at its control grid at that time regardless of the fact that the remaining resistor or resistors may be connected to a negative potential source. Only when every resistor R is connected to a negative source will the valve V14 be turned off at its control grid. This occurs only when the resistors are connected to the particular selection of output terminals of the different staticisor units which are all caused to go negative at the same time by reason of the application of a particular and unique configuration of instruction digits thereto. In consequence one storage tube only out of the plurality which may be provided can be arranged to be operative during any given action beat, whereas all of the tubes in the store operate simultaneously to regenerate the contents of their different storage lines during scan beats.

The moving of the tube beam in the Y direction is effected by the Y-shift waveform which is a modified form of that shown in Figure 25(h) of the aforesaid paper, whereby successive storage lines are scanned beats to effect systematic regeneration and any line is made available during the intervening action beats. The Y-shift generator YSG which provides this Y-shift waveform over lead 220 is conveniently of the form described with relation to Figures 35, 36 and 37 of the aforesaid paper with the exception that the various manual control switches S0, S1–S4 of that paper are dispensed with and the control of the flip-flops 0, 1–4, which govern the anode followers feeding the control grids of the valves $T^10–T^14$, is transferred to the output terminals of certain sections of the L staticisor LST, normally the first 5 sections which staticise the digits $p0–p4$ of an instruction signal and which govern the line selection in the store. When an appropriate potential is supplied from such staticisor output terminals the related ones of the valves $T^10–T^14$ are cut off during action beats to cause the appropriate value of current flow to the Y-shift valve in a manner exactly analogous to that described in the paper with reference to direct manual control. As the setting of the L staticisor normally varies at each action beat, the scanning level during successive action beats will be variable and not at a common level as shown in Figures 25(h) of the paper.

The accumulator unit A comprises a single storage tube 16 arranged in substantially identical manner to that described in connection with Fig. 5 with its pick-up plate 17 feeding signals to amplifier 18 and thence to a read unit 19. A write unit 20 controls the beam modulating electrode of the tube. The tube normally operates continuously over its two storage lines in turn so that the control by the $H_A$ waveform on valve V14, Fig. 5, is not needed. The direct connection by way of lead 172, Fig. 5, between the cathode of valve V11 and the control grid of valve V12 is also interrupted to allow the insertion of an arithmetical unit 21. The modified form of these elements is shown in Fig. 9 where it will be seen that the cathode of valve V11 of the read unit 19 of the storage device is connected to one input terminal 177 of an arithmetical unit 21 the output terminal 179 of which is connected to the control grid of valve V12. The separate write input to valve V12 of Fig. 5 through diode D16 is dispensed with, and this write input lead 161¹ is now connected to the second input terminal 178 of the arithmetical unit. The latter unit may be of any desired form, usually an adder circuit as well known in the art whereby two number representing pulse signal trains synchronised in timing with relation to one another may be so combined as to produce an output pulse train which represents the sum number of the two input numbers. It is this answer number output which therefore controls the subsequent modulation of the beam in the tube 16 and the consequential re-writing of the charge pattern on the tube screen. The output from the arithmetical unit is also made available for external use by way of lead 162. The output on this lead can represent the content of the accumulator tube itself if, at the time of reading the accumulator content, no input signals are applied on the second input lead 161¹ to the arithmetical unit 21.

The storage tube of the accumulator is arranged to have its beam execute a linear scanning motion in synchronism with the main store MS by applying the XTB waveform to its X deflection plates from busbar 231. At the most, this accumulator tube is required to store only a total of 40 digits, i. e. on two 20 digit X lines, and in consequence the Y-shift potentials therefor can be provided by a simplified and curtailed version of the Y-shift generator as used in the main storage device. As this Y-shift generator need provide only for the simple and repetitive scanning of the two separate storage lines in turn commencing with the first line or line 0 during the time of beat A2, which is when the first 20 digit section of any number will be applied to the accumulator, the Y-shift arrangements can be of the simple form shown in Figs. 23 and 24 of the paper, but restricted to two steps only. There is no requirement for proceeding to any variable and selectable level at particular times so that the generator circuit need comprise only one valve T0 of the arrangement shown in Figure 23, together with the related Y-shift valve and one counter circuit for controlling the valve T0.

The control unit CIS comprises another single cathode ray storage tube 25 arranged with its signal pick-up plate 26 feeding amplifier 27 and read unit 28 and having an adder unit 30 interposed between such read unit and the write unit 29 in substantially similar manner to that of the accumulator A as just described. The only major difference is that, as only one storage line is needed for the C1 or Control Instruction number no Y-deflection waveform only is necessary. As with the accumulator there is no need ever to suppress operation of the tube beam during certain beats and in consequence the Blackout valve V14 of Fig. 5 and its associated circuit elements are omitted.

The main store staticisor MSTR comprises a total of 20 similar sections divided between the address selecting or L staticisor unit LST and the function or F staticisor unit FST. Each section of each staticisor unit comprises a two-stable-state trigger circuit, e. g. of the Eccles-Jordan type and the first section of the L staticisor unit LST are shown in the lower half of Figure 3. As will be seen from this figure each section comprises a pair of therminonic valves V1, C2 cross-connected between anode and suppressor grids to provide the known form of two-stable-state trigger circuit. Referring particularly to the first section, the control grid of the first valve V1 is connected to the cathodes of two diodes D1, D2 and also by way of a load resistor R1 to a source of negative potential. The anode of the diode D1 is connected to the signal input lead 165 which is common to all of the main staticisor sections of MSTR, whereas the diode D2 is supplied with the $p0$ pulse waveform over busbar 135. The control grid of the opposite valve V2 is connected to a positive potential source through resistor R2 and also by way of differentiating condenser C1 and terminal 147 to the busbar 145 carrying a resetting waveform as shown in Fig. 1 ($f1$) and Fig. 1 ($f2$) and whose generation will be described later.

In the operation of such a staticisor section the trigger circuit is normally in the condition with valve V1 conducting and valve V2 cut off at its suppressor grid due to the preceding resetting pulse on busbar 147. If, during the time of any $p0$ pulse when the anode of diode D2 is driven negative, there is a coincident negative pulse on the instruction number applied on lead 165, the common cathode point of the diodes D1, D2 which form an "and" type gate, is driven negative and valve V1 is cut off. Unless these two pulses coincide, however, valve V1 will be unaffected and any other pulse than that present in digit interval $p0$ within the signal on lead 165 will not effect the trigger circuit. When valve V1 is cut off the potentials at the suppressor grids and anodes of the two valves will be reversed. Thus, whereas the anode potential of valve V1 and the suppressor grid potential of valve V2 are normally low and the anode potential of valve V2 and the suppressor grid potential of valve V1 are normally high, whenever the circuit is triggered as just explained, the potentials at the anode of valve V1 and suppressor grid of valve V2 become high and those of the anode of valve V2 and the suppressor grid of valve V1 become low. These output potentials are made available externally as control potentials by way of cathode follower valve stages V3, V4 and V5, V6.

The remaining trigger circuits of the main staticisor are substantially identical with the exception that diode D2 is supplied with the appropriate $pn$ pulse waveform instead of the $p0$ pulse waveform as in the first section, so that this section is sensitive alone to the pulse content of the required digit position in any input signal.

As a result of such an arrangement any dynamic pulse signal supplied on lead 165 is converted into a series of static output potentials controlled respectively by the pulse signal content of the different digit position of the input signal. Thus, with the first five sections of the staticisor unit LST which are used for controlling the Y shift generator YSG to select the required one of the 32 separate storage lines in the storage tube, the selection, for example, of line 21 is effected by giving the input pulse train the number significance of 10101 whereby the first, third and fifth sections of the staticisor will be triggered. By suitably connecting the cathode follower stage output of valve V3 of each of these sections to the related flip-flops of the circuit of Figure 35 of the aforesaid paper, the first, third and fifth flip-flops will be triggered to turn off the associated valves $T^10$, $T^12$ and $T^14$ whereas the remaining two valves $T^11$ and $T^13$ will remain turned on so that, in a manner exactly as explained in the aforesaid paper, line scanning during the next following action beat will be on line 21.

Figure 7:
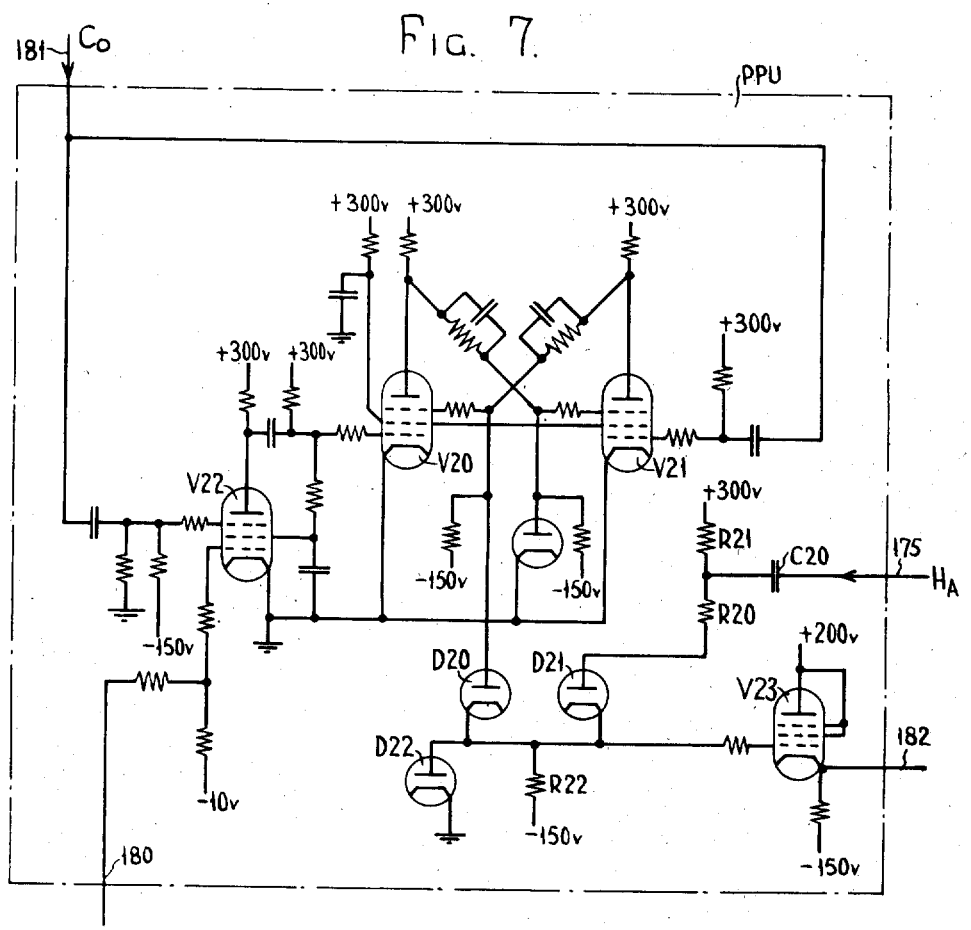
Figure 7 illustrates the circuit arrangement of the prepulse generating unit.

The pre-pulse unit PPU shown in detail in Fig. 7 serves to generate a sharp pulse signal which marks the commencement of each operative bar and comprises two pentode valves V20 and V21 cross-connected between their anodes and suppressor grids to constitute a conventional two-stable-state trigger circuit having separate triggering inputs to their respective control grids. The triggering input to the control grid of valve V20 is derived from the anode output of valve V22 whose control grid is normally held at a potential, relative to its cathode, sufficient to allow space current flow. This control potential is derived over lead 180 from a source, not shown, but which may include a manual switch for preventing the repetitive generation of pre-pulses when the machine is required not to operate with an automatic sequence but to operate bar by bar each separately initiated by a manually generated pulse which serves as an alternative pre-pulse. As such facility forms no part of the present invention it will not be described or illustrated. The valve V22 is normally held cut off at its suppressor grid but can be made momentarily conductive by the differentiated positive edge of the CO waveform, Fig. 1 $e1$ or 1 $e2$, supplied over busbar 181. When valve V22 is thus rendered momentarily conductive a negative-going pulse is delivered to the control grid of valve V20 to cut off the normal "on" condition of such valve and thus reverse the state of the trigger circuit to one in which valve V21 is conducting. This condition persists until the subsequent negative-going edge of the same CO waveform which, after differentiation, is applied to the control grid of valve V21 whereupon a reverse action occurs in the usual way.

The suppressor grid of valve V20, which is normally at or about earth potential due to the cut off state of the opposite valve V21, is connected to one diode D20 of a pair of diodes D20 and D21 which together constitute an "and" type gate. The opposite diode D21 of the pair has its anode connected to a source of positive potential +300 v. via a potentiometer network of resistors R20 and R21 the junction point of which is connected via capacitor C20 to busbar 175 carrying the $H_A$ waveform, Fig. 1 ($c1$) or 1 ($c2$). The common cathodes of diodes D20 and D21 are connected by way of load resistor R22 to a source of negative potential —150 v. and also to the control grid of a cathode follower valve V23 whose cathode constitutes the output supply connection for the pre-pulse waveform over busbar 182.

In the operation of this device, due to the trigger circuit of valves V20 and V21 being in its normal or reset condition with valve V20 conducting and valve V21 cut off, the anode of diode D20 is held at or about earth potential and the differentiated negative-going edges of the $H_A$ waveform are ineffective to pass through diode D21 to the control grid of the valve V23 due to the coincidence gate operation of the double diode circuit. Positive-going differentiated pulses of the $H_A$ waveform are passed directly to earth via further diode D22. The output valve V23 is normally in a state where it is conducting and the cathode point is at or about earth potential. Upon the arrival of a positive-going edge of the CO waveform, under 3 beat conditions, at the end of beat S2, the trigger circuit of valves V20 and V21 will be reversed whereby valve V21 is conducting and valve V20 is cut off whereupon the anode of diode D20 is driven negative relative to earth so that the coincident negative-going edge of the $H_A$ waveform provides a sharp differentiated pulse which passes through diode D21 and is operative on the cathode follower valve V23 to provide a similar sharp pulse output on busbar 182. The circuit is reset by the subsequent negative edge of the CO waveform at the beginning of beat S1 and no further $H_A$ pulses can pass therethrough until the trigger circuit is again triggered. The resultant pre-pulse waveform is varied according to the number of operative beats in the bar due to the controlling variation of the $H_A$ waveform.

Referring now to Fig. 6 which shows the arrangements of the Test Unit TU, the Action waveform generator AWG and an associated unit GYWG, the latter unit GYWG comprises a first two-stable-state trigger circuit 35 whose triggering input terminal is supplied with the aforementioned Prepulse signals and whose reset terminal is supplied with the Hs waveform, together with a second two-stable-state trigger circuit 36 whose triggering input terminal is supplied with a triggering pulse from an output of the trigger circuit 35 whenever the latter is altered from its triggered to its reset condition. The reset terminal of trigger circuit 36 is supplied with the Hs waveform.

The Test Unit TU comprises a two-stable-state trigger circuit 50 whose triggering input terminal is supplied with signals from either the accumulator A or the main store MS over lead 141 by way of coincidence gate circuit G50 which is controlled by the $p19$-pulse waveform and also by the outputs from three sections (0/13, 1/14 and 1/15) of the FST portion of the main staticisor MSTR. The reset terminal of the trigger circuit 50 is supplied with reset pulses derived over lead 200 from the trigger circuit 36 of the unit GYWG whenever such trigger circuit is altered either from its reset to its triggered state or from its triggered to its reset state. S/S indicates a normally-closed switch which is opened only when signal-stroke or manual control is required.

One output from trigger circuit 50, that which is negative-going when the trigger is in its reset state, controls a gate circuit G52 supplied with the $p0$-pulse waveform and also controlled by the output potential, over lead 201 from that output terminal of trigger circuit 35 of unit GYWG which is negative when the trigger 35 is in its triggered state. Another output from trigger circuit 50, that which is negative-going when the trigger is in its triggered state, controls a gate circuit G53 supplied with the $p1$-pulse waveform and also controlled by the same output from trigger circuit 35 of unit GYWG as that used at gate circuit G52. The outputs from gate circuits G52, G53 are combined and fed by way of lead 164 to the add circuit 30 of the control unit CIS.

The operation of the elements so far described is as follows. Trigger circuits 35, 36 are normally in their reset state due to the continuous supply of the Hs waveform. Upon arrival of a prepulse signal over busbar 182 at the commencement of an operative bar period, trigger circuit 35 is triggered, thereby supplying a gate opening potential to gate circuits G52, G53 of test unit TU over lead 201. Normally trigger circuit 50 of test unit TU is in its reset state so that gate G52 only is opened to allow the next $p0$-pulse (value +1) to be fed over lead 164 to the adding circuit 30 of control unit CIS.

If, however, during the preceding operative bar, the instruction used had been one calling for a Test operation (signalled by digit values 0, 1, 1 for the $p13$, $p14$ and $p15$ digit positions of the instruction) then gate G50 would have been conditioned to open during the $p19$-pulse interval of the last beat of the bar whilst a number signal input pulse train was applied to the gate circuit over lead 141. If such number signal contained a "1" digit pulse in its most significant ($p19$) digit position, such pulse would have passed through the gate circuit G50 and acted as a triggering pulse for trigger circuit 50. In such circumstances the trigger circuit 50 would be in its triggered state at the beginning of the next following bar period, and gate G53 would be opened instead of gate G52. This would have resulted in the release of the $p1$-pulse (value +2) to the adding circuit 30 of control unit CIS instead of the +1 signal previously described.

At the time of the next following negative-going edge of the Hs waveform (end of beat S1) trigger circuit 35 is reset and in so doing causes triggering of trigger circuit 36 whose output over lead 200 operates to reset trigger circuit 50 of test unit TU. As trigger circuit 35 has been reset both gate circuits G52, G53 are closed and remain so until the beginning of the next operative bar period.

The Action waveform generator AWG comprises a two-stable-state trigger circuit 40 whose triggering input terminal is supplied with the outputs on lead 200 from trigger circuit 36 of unit GYWG and whose reset terminal is supplied with the differentiated $H_A$ waveform. In operation, the trigger circuit 40 is normally in its reset state due to the continuous supply of the H<sub>A</sub> waveform but becomes triggered whenever the trigger circuit 36 of unit GYWG is reversed. The latter occurs at the end of beat S1 (when it is triggered due to reset of trigger circuit 35) and again at the end of beat S2 (when it is itself reset by the Hs waveform). In consequence, trigger circuit 40 becomes triggered at the beginning of beat A1, is reset by the H<sub>A</sub> waveform at the end of that beat, is again triggered at the beginning of beat A2 and is reset either at the end of that beat or at the end of beat A3 in dependence upon the form of the H<sub>A</sub> waveform, see Figs. 1 (c1) and 1 (c2). The respective outputs from the trigger circuit 40 constitute the Action and Para action waveforms used for various control purposes.

The S Erase waveform generator SEG (Fig. 2a) which supplies a control potential to inward transfer gate ITG and to the erase input 173 of the main store MS (see also Fig. 5) consists of a multiple input coincidence gate circuit fed with the Hs waveform and with a particular combination of outputs ($1/13$, $1/14$ and $9/15$) of the FST section of the staticisor MSTR whereby the gate circuit output, which constitutes the S Erase waveform, is normally at positive level. This causes gate ITG to be closed and the read unit 13 made fully operative. When, however, the Hs waveform is at a negative level and the particular digit combination 110 is set up on sections $p13$, $p14$ and $p15$ of the staticisor MSTR, then the Erase waveform is negative and causes opening of gate ITG and the blocking of the read unit 13 of the main store MS. When this occurs, the previous content of the particular storage location, then active in the store MS, is not regenerated and a new signal, fed in by way of gate ITG is recorded in its place.

In addition to those elements referred to above, which are to be found in the earlier machine, the present embodiment also includes a special Present Instruction or P. I. staticisor PSTR whose signal input is derived over lead 130 from the read output of the main store MS by way of a controlling gate circuit PSG. This P. I. staticisor has a number of separate sections equal to that of the main staticisor MSTR, and these sections are of generally similar form to those of the main staticisor and corresponding sections of the two staticisors are interconnected through separate buffer amplifiers in such a manner that the output of each section of the P. I. staticisor PSTR serves as a triggering input to the corresponding section of the main store staticisor MSTR.

Figure 3:
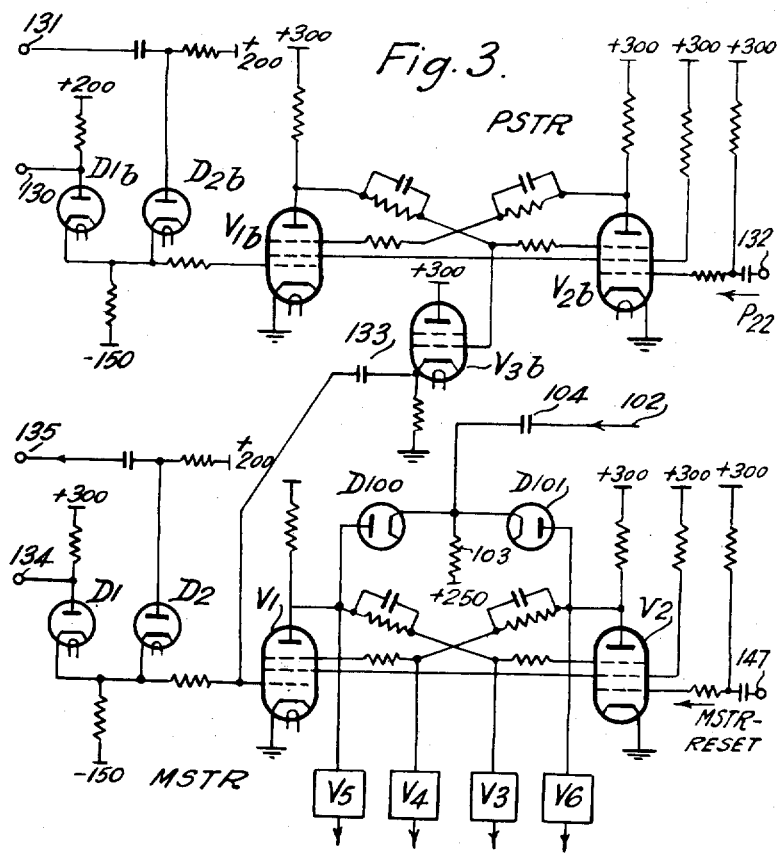
Figure 3 is a more detailed circuit diagram showing one pair of corresponding sections in the two staticisors and their manner of cross-connection.

Figure 3 illustrates in some detail one section of the P. I. staticisor PSTR together with the corresponding section of the main store staticisor MSTR to which it is cross-connected. Each of the staticisor sections is generally similar in form to that shown and described.

Referring to Fig. 3, each of the similar sections of the P. I. staticisor comprises valves V1b, V2b which, in conjunction with their associated circuit components, constitute a trigger circuit substantially similar to that already described with reference to the main staticisor valves V1 and V2 and which can be triggered from its normal condition in which valve V1b is conducting to its anode and valve V2b is cut off at its suppressor grid, by the coincidence of a negative-going input signal pulse of an instruction word, applied through the gate PSG and lead 130 with the related and similarly negative-going p-Pulse, applied through terminal 131 at the respective anodes of diodes D1b and D2b which form a multiple-diode gate circuit. When thus triggered, by the presence of a "1" digit signal in the related position of the dynamic instruction word, the potential of the anode of valve V1b and the suppressor grid of valve V2b rises. When the circuit is in its opposite, untriggered or "0" state, such anode or output potential is lower. Accordingly the potential of the cathode of the cathode follower valve V3b is indicative, in static form, of the particular digit of the dynamic instruction word applied to the section. Each of these trigger circuits of the P. I. staticisor is reset to its initial or "0" state by the differentiated version of the $p22$ pulse of the $p$-Pulse series applied through terminal 132 to the control grid of valve V2b. This pulse, it will be remembered, occurs during a Blackout period between a digit-handling portion of adjacent beats. The output voltage waveform at the cathode of the buffer cathode-follower valve V3b, in the form of a negative-going square pulse commencing at the instant of triggering of the section during a beat and ending at the instant of the $p22$ pulse during the Blackout period immediately following that beat is applied by way of differentiating condenser 133 as one input triggering medium to the control grid of one of the pair of trigger valves V1 and V2 of the corresponding section of the main store staticisor MSTR already described.

In order to provide the facility for automatically selecting the address of the second half of a 40-digit number word by stepping-on the main store staticisor MSTR in the manner described in greater detail in the aforesaid specification F, at least the first section of the address-selecting unit LST of the main store staticisor is provided with a further and common triggering input by way of lead 102 to the circuit of diodes D100 and D101 and resistance 103 connected between the common junction of the cathodes of the diodes to lead 102 and a source of positive potential. This lead 102 includes a condenser 104 which, in conjunction with resistance 103, constitutes a differentiating circuit for providing a sharp triggering pulse from the leading negative-going edge of an applied waveform. Each of the trigger valve pairs of the main store staticisor MSTR is arranged to be reset at the end of beat A1 by the leading edge of the Blackout pulse occurring at that time. The manner in which this particular MSTR-Reset waveform (shown in diagrams (f1) and (f2) of Fig. 1 is derived will be described in detail later.

The revised manner of operation of the machine of the present invention, as compared with the four-beat machine already referred to involves the effective elimination of the third or scan 2 beat of the earlier machine by transferring the extracted and temporarily staticized Present Instruction word directly to the main store staticisor instead of routing it by way of the Control Unit. Certain of the fundamental waveforms of the earlier machine, particularly those used for gate control and similar routing functions need to be modified to accommodate the new three-beat rhythm. This modification is carried out by means of a special circuit 136 which will be described in detail later. These modified waveforms include the two versions of the Halver waveform, Halver-A and Halver-S, a revised Instruction Gate waveform and the previously mentioned special MSTR-Reset waveform. These waveforms are shown in Fig. 1 with relation to the various beats of both the fundamental three-beat bar and the extended four-beat bar needed for the extraction of a 40-digit number. Diagram (b) of Fig. 1 shows the invariable Blackout waveform which is used as the basic generating waveform of the machine, diagrams (c1) and (c2) show the Halver–A waveform under 20- and 40-digit conditions respectively, diagram (d) shows the Instruction Gate waveform, diagrams (e1) and (e2) show the Counter 0 waveform under 20- and 40-digit conditions and which, as already described, constitute the primary one of a series of scale-of-two counting means for controlling the periodical and cyclic regeneration of the raster lines of the main store, while diagrams (f1) and (f2) show the MSTR-Reset pulses.

Figure 4:
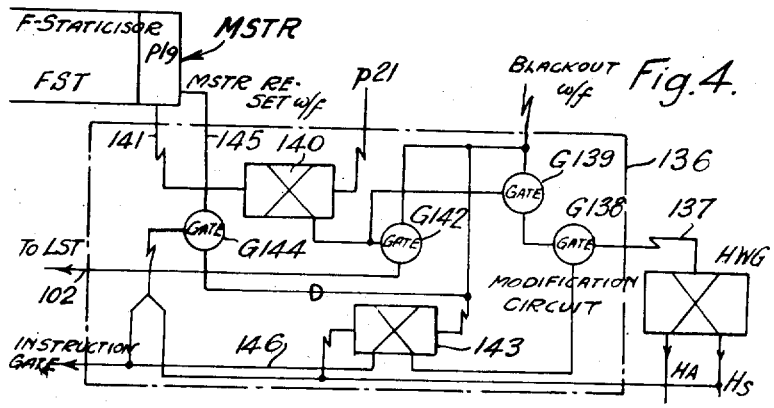
Figure 4 is a more detailed block schematic diagram showing the arrangements provided for automatic stepping-on of the main store staticisor, for generating the modified forms of Halver type waveform and for resetting the staticisors.

Figure 4 shows in block schematic form the general arrangement of the modification circuit 130 used for providing the altered waveforms necessary to obtain operation in the three-beat rhythm and to effect extension when necessary to a rhythm of four-beats to the bar. In this figure the fundamental waveform generator for the Halver waveform versions Halver–A and Halver–S comprises a two-stage trigger circuit HWG which has a single triggering input comprising the differentiated leading edges of the Blackout waveform applied through lead 137 so that successive applied pulses serve to trigger the circuit in alternate senses.

The triggering Blackout waveform input to the circuit HWG is applied by way of normally-open gate circuits G138, G139. A further two-state trigger circuit 140 has its triggering input provided over lead 141 from an output terminal of the special section, e. g. the last or $p19$ section, of the function-staticisor unit FST of the main store staticisor, whereby such circuit 140 is triggered whenever a present instruction word signalling a 40-digit extraction is applied to the staticisor. The circuit 140 is arranged to be reset by the $p21$ Pulse waveform. An output of this trigger circuit 140 controls the gate G139 to close the latter when the circuit 140 is triggered. An output of circuit 140 also controls a further, normally-closed gate circuit G142 so as to open the latter when the circuit is triggered. This gate circuit is in series with the lead 102 connecting the source of Blackout pulses to the common trigger input point of the first, $p0$, section of the address-selecting unit LST of the main store staticisor.

A further two-state trigger circuit 143 has its triggering input provided by a differentiated version of the Halver–S waveform and is reset by the differentiated Blackout waveform. One of its outputs controls the gate circuit G138 so as to close the latter when the circuit 143 is triggered while its other output provides the Instruction-gate waveform of Fig. 1($d$) on lead 146 and also serves as one of two alternative gate-opening media for a gate circuit G144 which is in lead 145 connecting the source of Blackout pulses to the common resetting terminals 147 (Fig. 3) for all of the main store staticisor sections. The alternative gate-opening medium for gate G144 is the Halver–S waveform.

The operation of this modification circuit is as follows: The Blackout pulse at the beginning of beat S1 passes through gates G138 and G139 since these are both normally open. The Halver waveform generator HWG is accordingly reversed. The polarity of the Halver–S waveform at this reversal is such that trigger circuit 143 is not triggered. The next following Blackout pulse at the beginning of beat A1 is accordingly also effective upon the Halver waveform generator HWG to cause a second reversal as shown in diagrams ($c1$) and ($c2$) of Fig. 1. At this reversal trigger circuit 143 is triggered and as a result gate circuit G138 is closed.

The next following Blackout pulse, at the beginning of beat A2 is not effective upon the Halver waveform generator HWG which is accordingly not reversed. This same Blackout pulse is however effective to reset the trigger circuit 143 and is also applied, by way of gate circuit G144 which is momentarily opened by the differentiated positive-going edge of the Instruction Gate waveform, as a resetting pulse for the main store staticisor MSTR, as depicted in diagrams ($f1$) and ($f2$). Fig. 1.

In view of the resetting of trigger circuit 143 gate circuit G138 reopens. If the normal three-beat rhythm is being followed the next following Blackout pulse at the end of beat A2 again causes triggering of the Halver waveform generator HWG to commence the next cycle of operations. At this instant the coincidence of the differentiated positive-going edge of the Halver–S waveform, applied as an alternative control to the gate circuit G144, allows the latter to pass the same Blackout pulse as a further resetting pulse in the MSTR-Reset waveform of Fig. 1 ($f1$).

The operation of the machine under three beat to the bar conditions is as follows.

The commencement of each operative bar is marked by the release of a Prepulse signal from the unit PPU. During the first beat S1, the $H_A$ waveform renders all the tubes in the main store MS operative and also causes the Y-scan generator YSG to be operative, as described in the aforesaid paper, to produce scanning at the next sequential level of the stepped Y-shift waveform as determined by the various Counter waveforms C0–C4. The gate OTG is closed due to the absence of any suitable control potentials from the staticisor MSTR while gate ITG is normally always closed. The various main store tubes therefore regenerate on the selected line. In the same beat, gate G52 of the Test unit TU is opened and the $p0$-pulse passes therethrough to the adding circuit 30 of the Control unit CL which is also regenerating the previous CI number therein. As the existing CI number is read out from read unit 28 to add unit 30 it is combined with such $p0$-pulse to increase the CI number by unity. This new CI number, comprises digit signals expressing the address in the main store MS where the next required Present Instruction is located, say line 11, and affects only the L-staticisor unit LST, all the function digits being "0." As the new CI number issues from the add unit 30 during this beat S1 it passes back into the tube 25 for retention until the next bar and also passes by lead 181 to the Instruction gate IG, which is opened in this beat only by the $H_A$ waveform, and thence over lead 165 to the staticisor MSTR where it sets up the various sections of the unit LST in accordance with the address of the required present instruction. Such staticisor is not yet effective however as control of scanning in the main store still resides in the Counter waveforms. In the same beat the accumulator A is regenerating line 0 of its two storage lines under the control of its own simple two stepped Y-shift waveform.

Upon the commencement of the second beat A1 of the bar, transfer of control of the Y-shift generator YSG to the staticisor unit LST takes place whereupon the single selected tube of the main store begins to scan the line 11 determined by the CI number. The content of this storage line is read out from the main store on lead 160 and passes over lead 140 to the gate PSG. The outward transfer gate OTG is still closed at this time as it is controlled by the function staticisor unit FST. Gate G105 is open however as Instruction gate waveform, Fig. 1$d$, is negative-going in this beat so that the present instruction number passes therethrough to the lead 130 and so to the various sections of the Present Instruction staticisor PSTR which becomes set up according to the digit signals of such number. At an instant during the next following Blackout period when the main staticisor setting for the CI can be dispensed with, the main staticisor is reset to zero on all of its sections by the MSTR-Reset waveform and immediately afterwards the Present Instruction staticisor is also reset to zero by the $p22$ pulse. This last resetting operation produces output pulses from each of those sections which had previously been set to the "1" condition and these operate to trigger the interconnected equivalent sections of the main staticisor MSTR which accordingly becomes set up with the Present Instruction number. During this same Blackout period the Y-shift generator YSG is thus altered to the required address selection setting for the number to be used in the computation while the sections of the F-staticisor FST are similarly set up according to the function digits of such instruction number. These digits define the type of operation which is to be performed with such number. For example, the instruction may call for the number to be fed to the accumulator and combined with, e. g. added to, the number, if any, already in the latter in which case suitable potentials will be provided to open the outward transfer gate OTG.

In the following third beat A2 of the bar, scanning of the main store MS at the address location called for takes place whereby the required number signal appears on the read output lead 160 and passes to its assigned destination. Thus, with the example quoted above, the gate OTG will be opened so that the read out signal from the main store MS passes over leads 160 and 163 to the arithmetical unit 21 where it is combined with the contents of the next sequential line, line 0, of the accumulator tube which is being regenerated at that time. This completion of this beat marks the end of the 3 beat bar and after the next Prepulse signal which follows at the end of the beat, the cycle of operations is repeated to select and utilise the next instruction and so on.

If, instead of a three-beat bar, a four-beat bar is to be operated, this will be signalled during the Blackout period between beats A1 and A2 by the triggering of the allotted (p19) section of the function staticisor unit FST to its "1" condition. This causes triggering of the trigger circuit 140 which thereupon opens gate circuit G142 in readiness to pass the next following Blackout pulse at the end of beat A2 and simultaneously closes gate circuit G139 to such Blackout pulse.

At the end of beat A2, the leading edge of the Blackout pulse is fed, in differentiated form as a stepping-on pulse to the first section of the address-selecting or L-staticisor unit LST to advance, by unity, the address number set up in the Y-shift generator YSG, i. e. to the address of the second half of the 40-digit number as described in said specification F. At the same time, this Blackout pulse is prevented from reaching the Halver waveform generator HWG which is accordingly not reversed at this instant.

The trigger circuit 140 is reset immediately after the leading edge of the Blackout pulse has passed, by the p21-pulse waveform whereby gate G139 is reopened in readiness for triggering by the next Blackout pulse occurring at the end of this extension beat A3.

As in the earlier machine, various further waveforms, such as the Counter waveforms, are derived from the Halver waveforms. These further waveforms automatically become modified in form by the alteration in the Halver waveform as illustrated in digrams (e1) and (e2) of Fig. 1.

In the above described particular embodiment the various elements can be of any suitable conventional form, for example the two-state trigger circuits may resemble those illustrated in connection with the staticisor elements while the gate circuits may again be of any convenient type, for instance, of the multiple diode type as used in the staticisor elements. A variety of modifications may clearly be made without departing from the scope of the invention while certain further minor changes, as compared with the earlier four-beat machine, which may be necessary in certain circumstances have not been described as their nature and the adaptations or extensions of the circuit technique involved will be obvious to those skilled in the art.

We claim:

1. An electronic digital computing machine of the type operating in the serial mode with number and instruction words signalled dynamically as electric pulse signal trains and comprising rhythmic data storage means controlled by an electric timing waveform to operate once during a predetermined minor cycle period and having a plurality of separate storage address locations for holding number word and instruction data signals, electric signal controlled address selecting means for said data storage means for rendering any one of said storage locations accessible for deriving an output signal train therefrom, a main staticisor having an input terminal for receiving an instruction pulse signal train and including a plurality of separate sections each responsive to a separate digit position pulse signal train of an instruction signal and providing alternative output control potentials in accordance with the significance of such digit position signal, circuit means supplying output control potentials from selected sections of said main staticisor as the controlling signals to said address selecting means, a rhythmic computing organ also controlled by an electric timing waveform to operate once during each minor cycle period for performing an arithmetical operation with pulse train number-representing signals applied thereto during such minor cycle period, an instruction staticisor having an input terminal for receiving an instruction pulse signal train and including a plurality of separate sections each responsive to separate digit position signals of such an instruction pulse signal train, signal transfer means connecting each section of said instruction staticisor to the related digit-responsive section of said main staticisor for setting-up each section of said main staticisor in accordance with the setting of related section of said instruction staticisor, timing means providing electric timing waveforms for said data storage means and said computing organ and defining a normal machine operating rhythm comprising three minor cycles or beats during each major cycle or bar which constitutes the time period required for the selection and obeying of an instruction pulse signal train to perform a single computation step, and a control system including signal transfer channels between said data storage means, said computing organ and said input terminals of said main and instruction staticisors for governing the selection and transfer of data signal trains between said data storage means and said computing organ under the control of a selected instruction pulse signal train, said control system being rhythmically operated by said timing waveforms and including means whereby an instruction pulse signal train is applied to said input terminal of said instruction staticisor during one beat of said operating rhythm bar to cause setting thereof in accordance with the configuration of the individual digit signals of said instruction pulse signal train and having further means whereby said signal transfer means is operated to transfer the respective settings of the different sections of said instruction staticisor in parallel to the related sections of said main staticisor before the commencement of the digit handling period of the next following beat of said bar.

2. An electronic digital computing machine according to claim 1 wherein said control system includes waveform modifying means for altering said timing waveforms to extend said fundamental three-beat rhythm to comprise four beats in a bar for the purpose of enabling operation with a basic number length which is twice that which can be expressed dynamically in a single beat.

3. An electronic digital computing machine as claimed in claim 1 in which each of said sections of said main staticisor and said instruction staticisor comprises an electric discharge tube trigger circuit, and wherein said connecting means between said staticisors comprises an interconnection circuit between an output point of each trigger circuit of said instruction staticisor and an input triggering point of the trigger circuit of the main staticisor which is responsive to the same digit-position.

4. An electronic digital computing machine as claimed in claim 3 wherein each said interconnection circuit includes means effecting triggering of the main staticisor trigger circuits by resetting the triggered trigger circuits of the instruction staticisor back to their initial untriggered state.

5. An electronic digital computing machine of the type operating in the serial mode with a rhythm consisting of a plurality of minor cycles in each major operation-performing cycle and with number representation in dynamic form by electric pulse signal trains of a predetermined time duration less than said minor cycle duration and wherein the coefficient of each digit of a number is signalled by the pulse signal content of the successively occurring digit intervals of such train and comprising a rhythmically operating main data storage device controlled by electric timing waveforms to execute one operative cycle in each minor cycle of said rhythm and having a plurality of separate storage locations for holding both number word and instruction representing signals, a rhythmic computing organ for performing an arithmetical operation with number-representing signal pulse trains applied to an input terminal thereof, a main staticisor having a signal input terminal and a plurality of sections each for converting the pulse-signal content of each different digit-interval of a pulse signal train fed to said input terminal into a related control potential, a separate instruction staticisor having an input signal terminal and a plurality of sections each for converting the pulse-signal content of each different digit-interval of an instruction signal fed to said input terminal into a related control potential, circuit means interconnecting each section of said instruction staticisor to the related section of said main staticisor whereby the latter may be conditioned to be set into the same condition as said instruction staticisor section, timing means including electric timing waveform generating means connected to said main data storage device and said computing organ, said timing waveforms defining the normal operating rhythm of the machine as consisting of three minor cycles or beats during each major cycle or bar which constitutes the time period required for the obeying of an instruction word to perform a single computation step and a control system, said control system comprising means including signal transfer channels between said main data storage device, said computing organ and said main and instruction staticisors for governing the selection and transfer of instruction signals between said main storage device and said instruction staticisor and of number signals between said main storage device and said computing organ under the control of a selected instruction and including further means whereby an instruction word selected from a chosen address in said main storage device is applied during a single beat of an operative bar to said instruction staticisor and wherein the setting of the respective sections of the latter are transferred instantaneously in parallel form to the related sections of the main staticisor before the commencement of the digit-handling portion of the next following beat of the same bar.

6. An electronic digital computing machine of the type operating in the serial mode with number and instruction words signalled dynamically as electric pulse signal trains and comprising a main data storage device of the cathode ray tube type having a plurality of separate storage locations for holding both number word and instruction word data items arranged as the different lines of a television type raster scanned by the tube beam, a line of said tube being scanned during each minor cycle or beat period of the machine operating rhythm under the control of a beat-defining electric waveform which includes a blackout period for fly back movement of the tube beam, electric signal controlled address selecting means for controlling the operative scanning line in said main storage device during any one beat period, a main staticisor having an instruction signal input terminal and including a plurality of separate sections each responsive to a separate digit of an applied instruction signal and providing at an output terminal alternative control potentials in accordance with the significance of such digit, circuit means connecting the output terminals of selected sections of said main staticisor to apply said control potentials thereat to control said address selecting means, a computing organ having a signal input terminal for performing an arithmetical operation with number-representing signals applied to said input terminal, an instruction staticisor having an instruction signal input terminal and a plurality of separate sections each responsive to separate digits of an instruction signal applied to such input terminal, signal transfer means connecting each section of said instruction staticisor to the related digit-responsive section of said main staticisor, timing means including a first electric waveform generator producing a beat defining electric waveform and a second electric waveform generator producing a bar defining electric waveform for defining a normal machine operating rhythm comprising three minor cycles or beats during each major cycle or bar which constitutes the time period required for the obeying of an instruction word to perform a single computation step, and a control system governed by said beat and bar defining electric waveforms and including signal controlled transfer channels between said main storage device, said computing organ input terminal and said staticisor input terminals for governing the selection and transfer of number signals between said main storage device and said computing organ under the control of selected instruction signals, said control system including means whereby an instruction signal is applied during the second beat of the operative bar to said instruction staticisor input terminal to cause setting of the sections thereof in accordance with the configuration of the digits of said instruction signal and having further means for operating said signal transfer means whereby the setting of said instruction staticisor sections is transferred in parallel through said signal transfer connecting means to the related sections of said main staticisor during the time of said cathode ray tube black-out period of said beat defining waveform for said main storage device which is between the second and third beats of the operative bar.

7. An electronic digital computing machine of the type operating in the serial mode at a set rhythm of a plurality of minor cycles or beats in every major cycle or bar with dynamic form of number representation by an electric pulse signal train occurring during each beat and wherein the coefficient of each digit of the number is signalled by the pulse signal content of the successively occurring digit intervals of such train and comprising a rhythmic main data storage device controlled by a timing waveform to operate through one cycle in every beat and having a plurality of separate storage address locations for holding both number word and instruction word data items, electric signal controlled address selecting means for said main data storage device, a computing organ controlled by a timing waveform to operate through one cycle in every beat for performing an arithmetic operation with a number-representing signal applied thereto, a main staticisor having an instruction signal input terminal and a plurality of sections each for converting the pulse signal content of each different digit-interval of a dynamic pulse signal train applied to such input terminal into a related static control potential, a separate instruction staticisor having an instruction input terminal and a plurality of sections each for converting the pulse signal content of each different digit-interval of a dynamic instruction word signal applied to such input terminal into a related static control potential, signal controlled signal transfer means interconnecting each section of said instruction staticisor to the related section of said main staticisor whereby the latter may be conditioned to be set into the same condition as said instruction staticisor section by an applied control signal, timing means including a first waveform generating means providing a timing waveform for said main data storage device and said computing organ and a plurality of further waveform generating means controlled by said first waveform generating means for providing additional controlling waveforms for said main data storage device and said computing organ and defining the normal operating rhythm of the machine as consisting of three minor cycles or beats during each major cycle or bar which constitutes the time period required for the obeying of an instruction word to perform a single computation step and a control system including signal transfer channels and gate means controlled by said timing waveforms for governing the selection and transfer of number signals between said main storage device and said computing organ under the control of selected instruction signals, said control system including means for selecting an instruction signal selected from a chosen address in said main storage device and applying it during the second beat of an operative bar to said instruction staticisor input terminal, means for operating said signal controlled signal transfer means to transfer the setting of the respective sections of said instruction staticisor instantaneously in parallel form to the related sections of the main staticisor before the commencement of the digit handling portion of the third beat of the same operative bar, and means for modifying the operation of said first waveform generating means of said timing means to extend the operative bar to include a fourth beat to enable operation with a number having twice the number of digits as the number of digit intervals in one operative beat, said modification of operation of said first waveform generating means being effective upon the further waveform generating means to modify their operation in accordance with the extended four-beat to the bar rhythm.

8. An electronic digital computing machine as claimed in claim 7 wherein said first waveform generating means comprises an electric discharge tube trigger circuit and which includes a triggering medium source for said trigger circuit consisting of a pulse waveform regularly repetitive once during each operative beat, and gate circuit means controlling the application of said triggering medium to said trigger circuit to inhibit triggering as necessary to provide the requisite modified wave formation.

9. An electronic digital computing machine of the type operating at a set rhythm of a plurality of minor cycles or beats in every major cycle or bar with serial form of number representation by a dynamic electric pulse signal train occurring during each beat and which comprises a main data storage device of the cathode ray tube type operating rhythmically once in each beat under the control of a first timing waveform and having a plurality of separate but immediately accessible storage address locations for holding both number word and instruction word data item signals, a main staticisor comprising a signal input terminal and a plurality of separate digit-selecting sections each supplied from said input terminal and operative to convert the pulse signal content of a selected digit position in an applied pulse signal train into a static control potential at a separate output terminal, said potential being characteristic of the coefficient of the digit represented by the applied signal, said main staticisor including a group of sections whose output potentials control address selection in said main storage device and a further group of sections whose output potentials constitute the functional control voltages, an instruction staticisor comprising a signal input terminal and a plurality of separate digit selecting sections each having a separate output control voltage supply terminal, a computing organ controlled by said first timing waveform to operate through one cycle in each beat period for performing an arithmetical operation with number-representing signals applied thereto, timing means including a first electric waveform generator for providing said first timing waveform and a second electric waveform generator for providing a second electric waveform defining a normal machine operating rhythm comprising three minor cycles or beats in each major cycle or bar which constitutes the time period required for the obeying of an instruction word to perform a single computation step, and a control system including signal transfer channels and signal controlled gate means in said channels for governing the selection and transfer of number words between said storage device and said computing organ under the control of the selected instruction words, said control system including means whereby said main staticisor is supplied at its signal input terminal in the first beat of a bar with a signal representing the address in the main storage device of the required instruction word, means controlled by the output control potential of said main staticisor whereby such selected instruction word signal is fed to said input signal terminal of said instruction staticisor during the second beat of said bar, means whereby the setting of said instruction staticisor sections are transferred in parallel instantaneously to effect resetting of related sections of said main staticisor at the end of said second beat to provide output control potentials to select the address of the required number word in said main storage device and to control said gate devices in said signal transfer channels for the performance of the required computation with such number word, and means whereby said required number is read from the main storage device and is handled according to the required computation step during the third beat of said bar.

10. In an electronic digital computing machine of the type operating in the serial mode with instructions signalled dynamically as electric pulse signal trains, a first pulse train staticisor device comprising a first pulse train input terminal, a plurality of separate sections operable selectively by the pulse content of the different pulse positions of an electric pulse signal train applied to said first pulse train input terminal, a reset terminal for receiving a reset pulse for resetting all of said plurality of separate sections, a second pulse train staticisor device comprising a second pulse train input terminal, a plurality of separate sections operable selectively by the pulse content of the different pulse positions of an electric pulse signal train applied to said second pulse train input terminal and a cross-connection between each one of said separate sections of said first staticisor device and a related section of said second staticisor device for effecting transfer of the setting state of said first staticisor device to said second staticisor device when said first staticisor device is reset by application of a reset pulse to said reset terminal.

11. In an electronic digital computing machine of the type operating in the serial mode with instructions signalled dynamically as electric pulse signal trains, a first pulse train staticisor device comprising a first pulse train input terminal, a plurality of separate sections each including a two-stable-state electronic trigger circuit arranged for selective triggering to an "on" state by the presence of a pulse in a different one of the sequential pulse positions of an electric pulse signal train applied to said first pulse train input terminal, a reset terminal for applying a reset pulse to each of said trigger circuits to reset any trigger circuit which is in the "on" state back to the "off" state, each of said trigger circuits having a pulse output terminal for delivering an output pulse when the related trigger circuit is reset from its "on" to its "off" state, a second pulse train staticisor device comprising a second pulse train input terminal, a plurality of separate sections at least equal in number to the number of sections of said first staticisor device, each of said sections of said second staticisor device comprising a two-stable-state electronic trigger circuit each having a triggering input and a resetting input, pulse selection means for each of said second staticisor trigger circuits connected between said second pulse train input terminal and its triggering input for effecting selective triggering of each triggering to its "on" state by the presence of a pulse in a different one of the sequential pulse positions of a pulse signal train applied to said second pulse train input terminal and a plurality of transfer connections, one between the output terminal of each of said first staticisor sections and the triggering input of a related one of said second staticisor sections whereby said second staticisor device becomes automatically set-up in accordance with the setting condition of said first staticisor device when said first staticisor device is reset.

References Cited in the file of this patent

UNITED STATES PATENTS

| | | |
|---|---|---|
| 2,404,047 | Flory | July 16, 1946 |
| 2,404,106 | Snyder | July 16, 1946 |
| 2,446,945 | Morton | Aug. 10, 1948 |
| 2,591,931 | Grosdoff | Apr. 8, 1952 |

(Other references on following page)

UNITED STATES PATENTS

| | | |
|---|---|---|
| 2,604,262 | Phelps | July 22, 1952 |
| 2,617,963 | Arditi | Nov. 11, 1952 |

FOREIGN PATENTS

| | | |
|---|---|---|
| 600,896 | Great Britain | Apr. 2, 1948 |

OTHER REFERENCES

"Proceedings of a Symposium on Large-Scale Digital Calculating Machinery," Harvard University Press, Cambridge, Massachusetts, 1948, pages 69 to 79.

"The Eniac," J. G. Brainerd & T. K. Sharpless Electrical Engineering, February 1948, pages 163 to 172.

"A Digital Computer for Scientific Applications," C. F. West & J. E. de Turk, Proc. I. R. E., December 1948, pages 1452 to 1460.